United States Patent [19]

Goto et al.

[11] Patent Number: 5,112,780
[45] Date of Patent: May 12, 1992

[54] SIALON BASED COMPOSITE AND METHOD OF MANUFACTURING THE SAME

[75] Inventors: Yasuhiro Goto, Tokyo; Takeyuki Yonezawa, Machida; Akihiko Tsuge; Michiyasu Komatsu, both of Yokohama, all of Japan

[73] Assignee: Kabushiki Kaisha Toshiba, Kawasaki, Japan

[21] Appl. No.: 521,548

[22] Filed: May 10, 1990

[30] Foreign Application Priority Data

May 12, 1989 [JP] Japan ................................ 1-117512
Dec. 21, 1989 [JP] Japan ................................ 1-329510

[51] Int. Cl.$^5$ ...................... C04B 35/58; C04B 35/80
[52] U.S. Cl. .................................. 501/95; 501/89; 501/92; 501/98
[58] Field of Search ................ 501/89, 92, 95, 98

[56] References Cited

U.S. PATENT DOCUMENTS

| | | | |
|---|---|---|---|
| 4,547,470 | 10/1985 | Tanase et al. | 501/98 X |
| 4,705,761 | 11/1987 | Kosugi | 501/98 X |
| 4,801,564 | 1/1989 | Buba | 501/98 X |
| 4,946,807 | 8/1990 | Okuno et al. | 501/89 |

FOREIGN PATENT DOCUMENTS

| | | | |
|---|---|---|---|
| 202504 | 11/1986 | European Pat. Off. | |
| 209320 | 1/1987 | European Pat. Off. | |
| 3423911 | 1/1985 | Fed. Rep. of Germany | 501/98 |
| 0246269 | 12/1985 | Japan | 501/98 |
| 61-291463 | 12/1986 | Japan | |
| 62-12670 | 1/1987 | Japan | |

*Primary Examiner*—Karl Group
*Attorney, Agent, or Firm*—Oblon, Spivak, McClelland, Maier & Neustadt

[57] ABSTRACT

A sialon based composite composite essentially consists of 5 wt % to 40 wt % of SiC fibers, 0.3 wt % to 10 wt % of an Hf component which is calculated in terms of Hf oxide, and the balance of sialon as a major constituent. In this case, the sialon is $\alpha$-sialon or $\beta$-sialon.

16 Claims, No Drawings

SIALON BASED COMPOSITE AND METHOD OF MANUFACTURING THE SAME

BACKGROUND OF THE INVENTION

1. Field of the Invention

The present invention relates to a sialon based composite having excellent mechanical strength and fracture toughness and a method of manufacturing the same.

2. Description of the Related Art

Two sialons are generally known: $\beta$-sialon which is represented by formula $Si_{6-z}Al_zO_zN_{8-z}$ (wherein $0 < z \leq 4.2$) and is obtained by adding $Al_2O_3$, AlN, $SiO_2$, and the like to $Si_3N_4$, and heating the resultant mixture to solid-dissolve these additives in $Si_3N_4$ (that is, to make a solid-solution), and $\alpha$-sialon which is represented by formula $M_x(Si,Al)_{12}(O,N)_{16}$ (wherein $0 < x \leq 2$; M represents at least one element selected from the group consisting of Li, Na, Ca, Mg, Y, and rare-earth elements) and in which a metal is soliddissolved in the crystal lattice of $Si_3N_4$. A sialon sintered body is excellent in heat resistance and oxidation resistance, and its strength is not degraded at high temperatures exceeding 1,300° C. In addition, even if a sialon sintered body is oxidized at a high temperature, its properties are not impaired. Therefore, sialon sintered bodies are expected to be applied as mechanical component materials required for use at high temperatures. A typical example of such a mechanical component is a ceramic gas turbine.

Although a sialon sintered body is excellent in heat resistance and oxidation resistance, it has poor mechanical strength and fracture toughness which lead to a decisive drawback in practical applications. Extensive studies has been made to improve the mechanical strength and fracture toughness of the sialon sintered bodies. Among them all, some of sialon based composite containing SiC fibers in sialons have been developed, as disclosed in Published Unexamined Japanese Patent Application No. 62-12670.

In such a sialon based composite, although the fracture toughness can be improved to some extent, the mechanical strength cannot be sufficiently improved, and improvement on mechanical strength is left unsolved. Strong demand has arisen for further improvements on fracture toughness in practical applications.

Although attempts have been made to improve the mechanical strength and fracture toughness of sialons, a best solution has not yet been found.

SUMMARY OF THE INVENTION

It is an object of the present invention to provide a sialon based composite which has excellent mechanical strength and fracture toughness and can be used in practical applications, and a method of manufacturing the same.

According to an aspect of the present invention, there is provided a sialon based composite consisting essentially of 5 wt % to 40 wt % of SiC fibers, 0.3 wt % to 10 wt % of an Hf component which is calculated in terms of an Hf oxide, and the balance of sialon as a major constituent.

According to another aspect of the present invention, there is provided a method of manufacturing a sialon based composite, comprising the first step of preparing a powder mixture as a starting material consisting of 5 wt % to 40 wt % of SiC fibers, 0.3 wt % to 10 wt % of an Hf component which is calculated in terms of an Hf oxide, and the balance of $Si_3N_4$ and $Al_2O_3$ as a sialon component, and the second step of sintering the powder mixture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENT

According to the present invention, there is provided a sialon based composite essentially consisting of 5 wt % to 40 wt % of SiC fibers, 0.3 wt % to 10 wt % of an Hf component which is calculated in terms of Hf oxide, and the balance of sialon as a major constituent. That is, the SiC fibers and the Hf component in the above composition ratio are added to the sialon.

The present inventors made extensive studies on additive components capable of increasing the mechanical strength of sialons and found that their mechanical strength was greatly increased upon addition of an Hf component in each sialon material. The addition of the Hf component is assumed to prevent growth of sialon grains to provide uniform fine grains. In addition, Hf itself as an additive component is present in the form of very fine grains of an Hf compound, and these grains are dispersed in a sintered body. Therefore, the grain boundary second phase having a low melting temperature is not formed and it is prevented that heat resistance and oxidation resistance of the composite are decreased by the grain boundary second phase.

A starting material of the Hf component is not limited to any specific one if it contains Hf. Examples of this starting material are Hf compounds (e.g., $HfO_2$, HfC, HfN, $HfB_2$, and $HfSi_2$) and metal Hf. Along these materials, $HfO_2$, HfC, and HfN are preferable. At least two of these materials may be mixed with each other. That is, the Hf component means Hf itself or an Hf compound. The content of the Hf component falls within the range of 0.3 to 10 wt % and preferably 1.0 wt % to 7.0 wt %. When the content of the Hf component is less than 0.3 wt %, a sufficient addition effect of the Hf component cannot be obtained. However, when the content of the Hf component exceeds 10 wt %, large grains of the Hf compound are undesirably obtained, and a sufficiently high mechanical strength cannot be obtained. In addition, addition in such a large amount results in an economical disadvantage.

Although the addition of an Hf component greatly improves the mechanical strength of sialon, the fracture toughness of the sialon is hardly changed if only the Hf component is added.

When the present inventors added SiC fibers known as an additive component for improving fracture toughness to sialon in addition to the Hf component, the fracture toughness could be greatly improved compared with a conventional sialon composite containing only SiC fibers. That is, the present inventors found that a sialon composite added with both SiC fibers and an Hf component to sialon greatly improves fracture toughness as compared with a sialon composite added with only SiC fibers. This fact is assumed to be based on the following mechanism.

In order to improve the fracture toughness of sialon upon addition of SiC fibers, an adhesive property of an interface between the sialon and the SiC fibers is an important factor. The improvement of the fracture toughness of the sialon upon addition of the SiC fibers to the sialon can be achieved when the SiC fibers dispersed in the sialon can be pulled out with an appropriate force. For this purpose, an appropriate adhesive property must be provided to the interface between the sialon and the SiC fibers. When an adhesion force acting on the interface is excessively large, the pull-out effect cannot be enhanced, and the fracture toughness cannot be improved. When the adhesion force acting on the interface is excessively small, growth of a crack formed in the sialon cannot be suppressed, and in this case too, the fracture toughness cannot be improved.

The Hf component as an additive component in the sialon based composite according to the present invention serves to provide an appropriate adhesive property to the interface between the sialon and the SiC fibers. That is, fine Hf compound grains formed in the sialon are present at the interface between the sialon grains and the SiC fibers and give the appropriate adhesive property described above.

Generally, a sialon material is relatively hard to sinter, and high-temperature sintering is required to consolidate a sialon composite. The SiC fibers as an additive component may be degraded during such hightemperature sintering. When an Hf component is added to the sialon, its sintering temperature can be lowered. Therefore, an addition of an Hf component can minimize degradation of the SiC fibers, and improves the fracture toughness of the sintered body.

The SiC fibers as one of the additive components described above may be single crystalline SiC whisker or polycrystalline SiC, and their length in the longitudinal direction is not limited to a specific value. When the length of the SiC fibers is increased, the fracture toughness of the sintered body can be increased. However, the mechanical strength tends to be decreased. Therefore, the length of the SiC fibers is preferably determined in consideration of environments in which composites are used. For example, when a sintered body is used under a condition wherein fracture toughness is of a primary importance, long fibers such as SiC continuous fibers are preferably used. However, when the mechanical strength is of a primary importance, short SiC whiskers are preferably used.

In addition, the SiC fibers may be composite fibers in which SiC layers are formed around C fibers as core fibers by a CVD method or the like.

The content of the SiC fibers falls within the range of 5 to 40 wt %, and preferably 10 to 30 wt %. When the content is less than 5 wt %, an addition effect of SiC fibers cannot be obtained. However, when the content of the SiC fibers exceeds 40 wt %, it is difficult to densify. In this case the density of the resultant sintered body is undesirably low, thus degrading properties such as mechanical strength.

In the sialon based composite according to the present invention, the sialon as the major constituent may be $\beta$-sialon or $\alpha$-sialon. The $\beta$-sialon is better than the $\alpha$-sialon to obtain a sialon based composite having better fracture toughness. $\beta$-sialon is a sintered body having a composition defined by the following formula:

$$Si_{6-z}Al_zN_{8-z}$$

(wherein $0 < z \leq 4.2$) and can be generally obtained by sintering a mixture of $Si_3N_4$, $Al_2O_3$, AlN, $SiO_2$, and the like. $\alpha$-sialon is a sintered body having a composition defined by the following formula:

$$M_x(Si,Al)_{12}(O,N)_{16}$$

(wherein $0 < x \leq 2$; M represents at least one element selected from the group consisting of Li, Na, Ca, Mg, Y, and rare-earth elements) and can be generally obtained by sintering a mixture of $Si_3N_4$, AlN, $Y_2O_3$, and the like. According to the present invention, impurities and additives may be contained in the sialon as the major constituent in amounts small enough not to impair the effect of the present invention.

A method of manufacturing a sialon based composite according to the present invention will be described below. This method of manufacturing a sialon based composite, comprises the first step of preparing a powder mixture as a starting material consisting essentially of 5 wt % to 40 wt % of SiC fibers, 0.3 wt % to 10 wt % of an Hf component which is calculated in terms of Hf oxide, and the balance of $Si_3N_4$ and $Al_2O_3$ as a sialon component, and the second step of sintering the powder mixture. The sialon based composite manufactured as described above contains $\beta$-sialon as a major constituent. That is, the method according to the present invention is characterized in that two components, namely, $Si_3N_4$ and $Al_2O_3$ are used as materials for obtaining the $\beta$-sialon as the major constituent.

The $\beta$-sialon represented by formula $Si_{6-z}Al_zN_{8-z}$ (wherein $0 < z \leq 4.2$) has a crystal structure in which $Al_2O_3$ is solid-dissolved in $Si_3N_4$. When the two components, i.e., $Si_3N_4$ and $Al_2O_3$ are used, the $\beta$-sialon can be ideally prepared. In practice, however, it is difficult to sinter only $Si_3N_4$ and $Al_2O_3$, and other components such as AlN and $SiO_2$ described above are also used. These other components are left as grain boundary phases in the sialon sintered body and degrade resistance to oxidation of the sintered body. Therefore, use of these components is not preferable.

The method of the present invention has been made in consideration of the above situation, and the $\beta$-sialon as the major constituent is obtained by using two components, i.e., $Si_3N_4$ and $Al_2O_3$.

According to the present invention, the Hf component as an additive component can improve mechanical strength and fracture toughness of the sialon, decreases its sintering temperature, and enhances solid dissolving of $Al_2O_3$ in $Si_3N_4$. It is thus possible to constitute the sialon as the major constituent by $Si_3N_4$ and $Al_2O_3$. In this case, degradation of resistance to oxidation caused by a grain boundary phase left in the sintered body does not occur. According to the manufacturing method of the present invention, in the first step, a powder mixture of a starting material consisting of SiC fibers, an Hf component, $Si_3N_4$, and $Al_2O_3$ is prepared. At this time, in order to obtain a sialon based composite having excellent mechanical strength and excellent fracture toughness, the content of the SiC fibers falls within the range of 5 to 40 wt %, preferably 10 to 30 wt %, and the content of the Hf component falls within the range of 0.3 to 15 wt %, preferably 1.0 wt % to 7.0 wt %, when this content is calculated in terms of its oxide. In addition, the content of the $Al_2O_3$ preferably falls within the range of 5 to 30 wt %, and the balance is preferably $Si_3N_4$.

In the second step, the powder mixture prepared in the first step is sintered. A hot-pressing or a normal pressure sintering method may be used in this sintering. The density of the resultant sintered body formed by the hot-pressing is higher than the density of the resultant sintered body formed by the normal pressure sintering.

According to the method of the present invention, as compared with a conventional method in which other components such as AlN and $SiO_2$ are used together with the two components, i.e., $Si_3N_4$ and $Al_2O_3$, a sialon based composite having excellent properties such as resistance to oxidation can be easily obtained.

EXAMPLES

The present invention will be described in detail by way of its examples.

EXAMPLE 1

Powders of Hf compounds and sialon components which had composition ratios, shown in Table 1, were mixed with a plastic ball mill for about 12 hours to prepare each powder mixture. The sialon component powder was prepared in advance as follows.

As for an α-sialon component, 63.0 mol % of an $Si_3N_4$ powder having an average grain size of 0.7 μm, 33.3 mol % of an AlN powder having an average grain size of 0.8 μm, and 3.7 mol % of a $Y_2O_3$ powder having an average grain size of 0.9 μm were mixed to prepare a powder represented by formula $Y_{0.4}(Si,Al)_{12}(O,N)_{16}$.

As for a β-sialon component, a powder represented by a composition of $Si_4Al_2O_2N_6$ and a powder represented by a composition of $Si_5AlON_7$ were used. The $Si_4Al_2O_2N_6$ powder was obtained by using a synthetic β-sialon powder SZ-2 (tradename) available from Ube Industries, Ltd. or by mixing an $Si_3N_4$ powder having an average grain size of 0.7 μm, an AlN powder having an average grain size of 0.8 μm, and an $Al_2O_3$ powder having an average gain size of 0.9 μm. The $Si_5AlON_7$ powder was prepared by mixing the above powders.

SiC continuous fibers were aligned in one direction in each amount shown in Table 1 in each powder mixture, and were pressed at a pressure of about 1,000 kg/cm², thereby obtaining each green body having a length of 50 mm, a width of 50 mm, and a thickness of 7 mm. Each green body was charged in a carbon mold and was hot-pressed in a nitrogen gas atmosphere at a temperature of 1,700° C. and a pressure of 300 kg/cm² for 30 minutes, thereby preparing sialon based composites represented by sample Nos. 1 to 20. These samples have compositions falling within the range of the present invention.

Each resultant sample was worked into a test piece having a size of 4 mm×3 mm×40 mm, and the strength of each sample was measured at room temperature and 1,300° C. in accordance with a three-point bending test complying with the JIS (Japanese Industrial Standards). The fracture toughness of each sample was measured by an SENB method (Single Edge Notched Beam Method) at room temperature by forming a notch having a width of 0.1 mm and a depth of 0.75 mm in each sample. In the strength and fracture toughness measurements, a tensile stress acted in the same direction as the alignment direction of the SiC continuous fibers. The test results are summarized in Table 1.

As is apparent from Table 1, the resultant sialon based composites were not degraded at high temperatures and had excellent fracture toughness and excellent mechanical strength.

COMPARATIVE EXAMPLE 1

Following the same procedures as in Example 1, sialon based composite represented by sample Nos. 21 to 29 having compositions falling outside the range of the present invention were prepared using the additive components shown in Table 2 and powders of sialon components shown in Table 2 as starting materials.

The same tests as in Example 1 were performed for the resultant samples, and test results are summarized in Table 2. As is apparent from Table 2, the sialon based composites thus obtained had poorer mechanical strength and fracture toughness than those of the sintered bodies obtained in Example 1.

TABLE 1

| Sample No. | Sialon Component | Additive Component | | | | | SiC Continuous Fiber (wt %) | Mechanical Strength (1300° C.) (kg/mm²) | Mechanical Strength (1300° C.) (kg/mm²) | Fracture Toughness (MPam$^{\frac{1}{2}}$) |
|---|---|---|---|---|---|---|---|---|---|---|
| | | $HfO_2$ (wt %) | HfC (wt %) | HfN (wt %) | $HfB_2$ (wt %) | $HfSi_2$ (wt %) | | | | |
| 1 | $Si_5AlON_7$ | 0.3 | 0 | 0 | 0 | 0 | 30 | 88.1 | 83.5 | 18.6 |
| 2 | $Si_5AlON_7$ | 3.0 | 0 | 0 | 0 | 0 | 30 | 95.2 | 84.0 | 19.8 |
| 3 | $Si_5AlON_7$ | 5.0 | 0 | 0 | 0 | 0 | 30 | 91.1 | 83.1 | 19.0 |
| 4 | $Si_5AlON_7$ | 7.0 | 0 | 0 | 0 | 0 | 30 | 87.3 | 78.6 | 19.0 |
| 5 | $Si_5AlON_7$ | 10.0 | 0 | 0 | 0 | 0 | 30 | 83.4 | 75.5 | 18.8 |
| 6 | $Si_4Al_2O_2N_6$ | 3.0 | 0 | 0 | 0 | 0 | 30 | 84.6 | 73.7 | 19.5 |
| 7 | $Si_4Al_2O_2N_6$(SZ-2) | 3.0 | 0 | 0 | 0 | 0 | 30 | 83.8 | 71.5 | 19.3 |
| 8 | $Y_{0.4}(Si,Al)_{12}(O,N)_{16}$ | 3.0 | 0 | 0 | 0 | 0 | 30 | 80.6 | 70.6 | 18.0 |
| 9 | $Si_5AlON_7$ | 3.0 | 0 | 0 | 0 | 0 | 5 | 85.0 | 81.6 | 15.4 |
| 10 | $Si_5AlON_7$ | 3.0 | 0 | 0 | 0 | 0 | 10 | 86.1 | 81.8 | 16.8 |
| 11 | $Si_5AlON_7$ | 3.0 | 0 | 0 | 0 | 0 | 15 | 93.6 | 82.0 | 17.9 |
| 12 | $Si_5AlON_7$ | 3.0 | 0 | 0 | 0 | 0 | 25 | 90.3 | 80.1 | 19.2 |
| 13 | $Si_5AlON_7$ | 3.0 | 0 | 0 | 0 | 0 | 40 | 81.4 | 74.2 | 17.4 |
| 14 | $Si_5AlON_7$ | 0 | 3.0 | 0 | 0 | 0 | 30 | 90.2 | 78.6 | 19.3 |
| 15 | $Si_5AlON_7$ | 0 | 0 | 3.0 | 0 | 0 | 30 | 88.2 | 80.2 | 19.2 |
| 16 | $Si_5AlON_7$ | 0 | 0 | 0 | 3.0 | 0 | 30 | 83.6 | 74.4 | 18.1 |
| 17 | $Si_5AlON_7$ | 0 | 0 | 0 | 0 | 3.0 | 30 | 82.7 | 73.1 | 17.9 |
| 18 | $Y_{0.4}(Si,Al)_{12}(O,N)_{16}$ | 0.3 | 0 | 0 | 0 | 0 | 30 | 75.2 | 70.6 | 17.8 |
| 19 | $Y_{0.4}(Si,Al)_{12}(O,N)_{16}$ | 7.0 | 0 | 0 | 0 | 0 | 30 | 78.2 | 68.4 | 17.9 |
| 20 | $Y_{0.4}(Si,Al)_{12}(O,N)_{16}$ | 10.0 | 0 | 0 | 0 | 0 | 30 | 76.7 | 67.9 | 17.6 |

TABLE 2

| Sample No. | Sialon Component | Additive Component | | | | | | Mechanical Strength (1300° C.) (kg/mm$^2$) | Mechanical Strength (1300° C.) (kg/mm$^2$) | Fracture Toughness (MPam$^{\frac{1}{2}}$) |
|---|---|---|---|---|---|---|---|---|---|---|
| | | HfO$_2$ (wt %) | HfC (wt %) | HfN (wt %) | HfB$_2$ (wt %) | HfSi$_2$ (wt %) | SiC Continuous Fiber (wt %) | | | |
| 21 | Si$_5$AlON$_7$ | 0 | 0 | 0 | 0 | 0 | 0 | 52.1 | 53.0 | 3.3 |
| 22 | Si$_5$AlON$_7$ | 0 | 0 | 0 | 0 | 0 | 30 | 48.7 | 48.5 | 5.6 |
| 23 | Si$_5$AlON$_7$ | 3.0 | 0 | 0 | 0 | 0 | 0 | 76.4 | 73.2 | 3.0 |
| 24 | Si$_5$AlON$_7$ | 0.1 | 0 | 0 | 0 | 0 | 30 | 44.2 | 42.1 | 5.8 |
| 25 | Si$_5$AlON$_7$ | 15.0 | 0 | 0 | 0 | 0 | 30 | 58.6 | 57.4 | 5.5 |
| 26 | Si$_5$AlON$_7$ | 3.0 | 0 | 0 | 0 | 0 | 3 | 74.7 | 70.9 | 3.2 |
| 27 | Si$_5$AlON$_7$ | 3.0 | 0 | 0 | 0 | 0 | 45 | 41.8 | 39.0 | 2.9 |
| 28 | Si$_4$Al$_2$O$_2$N$_6$ | 0 | 0 | 0 | 0 | 0 | 0 | 48.8 | 47.2 | 2.8 |
| 29 | Y$_{0.4}$(Si,Al)$_{12}$(O,N)$_{16}$ | 0 | 0 | 0 | 0 | 0 | 0 | 45.5 | 42.4 | 2.8 |

EXAMPLE 2

Powders of additive components and sialon components which had composition ratios shown in Table 3 were mixed with a plastic ball mill for about 12 hours to prepare starting powder. The sialon component powders were prepared following the same procedures as in Example 1.

Sintering was performed by a hot-pressing. That is, each powder was cold-pressed at a pressure of about 1,000 kg/cm$^2$ to obtain a green body. Each green body was charged in a carbon mold and sintered in a nitrogen gas atmosphere at a temperature of 1,750° C. and a pressure of 300 kg/cm$^2$ for 30 minutes, thereby preparing sialon based composite represented by sample Nos. 30 to 49. These samples have compositions falling within the range of the present invention.

The same tests as in Example 1 were performed for the resultant samples, and test results are shown in Table 3. As is apparent from Table 3, the sialon based composites thus obtained were not so degraded at high temperatures and had excellent mechanical strength and excellent fracture toughness.

COMPARATIVE EXAMPLE 2

Following the same procedures as in Example 2, sialon based composites represented by sample Nos. 50 to 57 having compositions falling outside the range of the present invention were prepared using additive and sialon components having the composition ratios shown in Table 4 as starting materials.

The same tests as in Example 2 were performed for the resultant samples, and test results are shown in Table 4. As is apparent from Table 4, the sialon based composites thus obtained had poorer mechanical strength and fracture toughness than those of the sintered bodies obtained in Example 2.

TABLE 3

| Sample No. | Sialon Component | Additive Component | | | | | | Mechanical Strength (1300° C.) (kg/mm$^2$) | Mechanical Strength (1300° C.) (kg/mm$^2$) | Fracture Toughness (MPam$^{\frac{1}{2}}$) |
|---|---|---|---|---|---|---|---|---|---|---|
| | | HfO$_2$ (wt %) | HfC (wt %) | HfN (wt %) | HfB$_2$ (wt %) | HfSi$_2$ (wt %) | SiC Whisker (wt %) | | | |
| 30 | Si$_5$AlON$_7$ | 0.3 | 0 | 0 | 0 | 0 | 20 | 105 | 98.0 | 9.3 |
| 31 | Si$_5$AlON$_7$ | 3.0 | 0 | 0 | 0 | 0 | 20 | 114 | 101 | 9.4 |
| 32 | Si$_5$AlON$_7$ | 5.0 | 0 | 0 | 0 | 0 | 20 | 107 | 96.1 | 8.9 |
| 33 | Si$_5$AlON$_7$ | 8.0 | 0 | 0 | 0 | 0 | 20 | 102 | 90.2 | 8.8 |
| 34 | Si$_5$AlON$_7$ | 10.0 | 0 | 0 | 0 | 0 | 20 | 92.2 | 87.6 | 8.5 |
| 35 | Si$_4$Al$_2$O$_2$N$_6$ | 3.0 | 0 | 0 | 0 | 0 | 20 | 103 | 94.6 | 9.0 |
| 36 | Si$_4$Al$_2$O$_2$N$_6$(SZ-2) | 3.0 | 0 | 0 | 0 | 0 | 20 | 112 | 100 | 9.2 |
| 37 | Y$_{0.4}$(Si,Al)$_{12}$(O,N)$_{16}$ | 3.0 | 0 | 0 | 0 | 0 | 20 | 90.6 | 78.6 | 8.2 |
| 38 | Si$_5$AlON$_7$ | 3.0 | 0 | 0 | 0 | 0 | 5 | 110 | 102 | 7.8 |
| 39 | Si$_5$AlON$_7$ | 3.0 | 0 | 0 | 0 | 0 | 10 | 111 | 107 | 8.2 |
| 40 | Si$_5$AlON$_7$ | 3.0 | 0 | 0 | 0 | 0 | 15 | 115 | 107 | 8.9 |
| 41 | Si$_5$AlON$_7$ | 3.0 | 0 | 0 | 0 | 0 | 25 | 112 | 98.6 | 9.2 |
| 42 | Si$_5$AlON$_7$ | 3.0 | 0 | 0 | 0 | 0 | 30 | 109 | 93.7 | 9.2 |
| 43 | Si$_5$AlON$_7$ | 0 | 3.0 | 0 | 0 | 0 | 20 | 113 | 100 | 9.2 |
| 44 | Si$_5$AlON$_7$ | 0 | 0 | 3.0 | 0 | 0 | 20 | 109 | 97.4 | 9.0 |
| 45 | Si$_5$AlON$_7$ | 0 | 0 | 0 | 3.0 | 0 | 20 | 98.6 | 79.5 | 8.6 |
| 46 | Si$_5$AlON$_7$ | 0 | 0 | 0 | 0 | 3.0 | 20 | 95.3 | 78.6 | 8.5 |
| 47 | Y$_{0.4}$(Si,Al)$_{12}$(O,N)$_{16}$ | 0.3 | 0 | 0 | 0 | 0 | 20 | 88.4 | 73.1 | 8.0 |
| 48 | Y$_{0.4}$(Si,Al)$_{12}$(O,N)$_{16}$ | 8.0 | 0 | 0 | 0 | 0 | 20 | 92.8 | 86.5 | 8.3 |
| 49 | Y$_{0.4}$(Si,Al)$_{12}$(O,N)$_{16}$ | 10.0 | 0 | 0 | 0 | 0 | 20 | 91.5 | 85.3 | 8.1 | the resultant samples, and test results are shown in

TABLE 4

| Sample No. | Sialon Component | Additive Component | | | | | | Mechanical Strength (1300° C.) (kg/mm$^2$) | Mechanical Strength (1300° C.) (kg/mm$^2$) | Fracture Toughness (MPam$^{\frac{1}{2}}$) |
|---|---|---|---|---|---|---|---|---|---|---|
| | | HfO$_2$ (wt %) | HfC (wt %) | HfN (wt %) | HfB$_2$ (wt %) | HfSi$_2$ (wt %) | SiC Whiskers Fiber (wt %) | | | |
| 50 | Si$_5$AlON$_7$ | 0 | 0 | 0 | 0 | 0 | 0 | 52.1 | 55.0 | 3.3 |
| 51 | Si$_5$AlON$_7$ | 0 | 0 | 0 | 0 | 0 | 20 | 56.0 | 55.1 | 4.2 |
| 52 | Si$_5$AlON$_7$ | 3.0 | 0 | 0 | 0 | 0 | 0 | 76.4 | 73.2 | 3.0 |
| 53 | Si$_5$AlON$_7$ | 0.1 | 0 | 0 | 0 | 0 | 20 | 58.8 | 58.9 | 4.2 |
| 54 | Si$_5$AlON$_7$ | 15.0 | 0 | 0 | 0 | 0 | 20 | 62.2 | 60.6 | 4.1 |
| 55 | Si$_5$AlON$_7$ | 3.0 | 0 | 0 | 0 | 0 | 3 | 80.7 | 80.4 | 3.0 |
| 56 | Si$_4$Al$_2$O$_2$N$_6$ | 0 | 0 | 0 | 0 | 0 | 0 | 48.8 | 47.2 | 2.8 |

TABLE 4-continued

| Sample No. | Sialon Component | Additive Component | | | | | | Mechanical Strength (1300° C.) (kg/mm²) | Mechanical Strength (1300° C.) (kg/mm²) | Fracture Toughness (MPam^½) |
|---|---|---|---|---|---|---|---|---|---|---|
| | | $HfO_2$ (wt %) | HfC (wt %) | HfN (wt %) | $HfB_2$ (wt %) | $HfSi_2$ (wt %) | SiC Whiskers Fiber (wt %) | | | |
| 57 | $Y_{0.4}(Si,Al)_{12}(O,N)_{16}$ | 0 | 0 | 0 | 0 | 0 | 0 | 45.5 | 42.4 | 2.6 |

EXAMPLE 3

$Si_3N_4$ powders having an average grain size of 0.7 μm, $Al_2O_3$ powders having an average grain size of 0.9 μm, and $HfO_2$, HfN or HfC powders having an average grain size of 1 μm were mixed in composition ratios shown in Table 5, and each mixing was performed with a plastic ball mill for about 12 hours to prepare a starting powder. SiC continuous fibers having compositions shown in Table 5 were aligned in one direction in the corresponding material powder as in Example 1, thereby preparing sialon based composites represented by sample Nos. 58 to 69 containing β-sialon components as major constituents. These samples have compositions falling within the range of the present invention.

The same tests as in Example 1 were performed for these samples, and test results are summarized in Table 5. As is apparent from Table 5, the sialon based composites had excellent fracture toughness and sufficient mechanical strength.

COMPARATIVE EXAMPLE 3

Following the same procedures as in Example 3, sialon based composites represented by sample Nos. 70 to 72 having compositions falling outside the range of the present invention were prepared using additive and sialon components having the composition ratios shown in Table 6 as starting materials.

The same tests as in Example 3 were performed for the resultant samples, and test results are shown in Table 6. As is apparent from Table 6, the sialon based composites thus obtained had poorer mechanical strength and fracture toughness than those of the sintered bodies obtained in Example 3.

EXAMPLE 4

Powders of additive and sialon components having composition ratios shown in Table 7 were mixed with a plastic ball mill for about 12 hours to prepare starting powders. Following the same procedures as in Example 2, sialon based composites represented by sample Nos. 73 to 84 having β-sialon components as major constituents were prepared. The samples have compositions falling within the range of the present invention.

The same tests as in Example 1 were performed for the resultant samples, and test results are shown in Table 7. As is apparent from Table 7, the sialon based composites thus obtained were not so degraded at high temperatures and had excellent mechanical strength and excellent fracture toughness.

COMPARATIVE EXAMPLE 4

Following the same procedures as in Example 4, sialon based composites represented by sample Nos. 85 to 87 having compositions falling outside the range of the present invention were prepared using additive and sialon components having the composition ratios shown in Table 8 as starting materials.

The same tests as in Example 4 were performed for the resultant samples, and test results are shown in Table 8. As is apparent from Table 8, the sialon based composites thus obtained had poorer mechanical strength and fracture toughness than those of the sintered bodies obtained in Example 4.

Additional advantages and modifications will readily occur to those skilled in the art. Therefore, the invention in its broader aspects is not limited to the specific details, illustrated examples shown and described. Ac-

TABLE 5

| Sample No. | Sialon Component | | Additive Component | | | | Mechanical Strength (1300° C.) (kg/mm²) | Mechanical Strength (1300° C.) (kg/mm²) | Fracture Toughness (MPam^½) |
|---|---|---|---|---|---|---|---|---|---|
| | $Si_3N_4$ (wt %) | $Al_2O_3$ (wt %) | $HfO_2$ (wt %) | HfN (wt %) | HfC (wt %) | SiC Continuous Fiber (wt %) | | | |
| 58 | 82 | 10 | 3 | 0 | 0 | 5 | 85 | 81 | 7.2 |
| 59 | 77 | 10 | 3 | 0 | 0 | 10 | 86 | 83 | 7.4 |
| 60 | 67 | 10 | 3 | 0 | 0 | 20 | 83 | 78 | 7.8 |
| 61 | 57 | 10 | 3 | 0 | 0 | 30 | 78 | 77 | 16.3 |
| 62 | 47 | 10 | 3 | 0 | 0 | 40 | 77 | 75 | 16.8 |
| 63 | 72 | 5 | 3 | 0 | 0 | 20 | 80 | 80 | 14.9 |
| 64 | 62 | 15 | 3 | 0 | 0 | 20 | 85 | 82 | 15.8 |
| 65 | 57 | 20 | 3 | 0 | 0 | 20 | 84 | 79 | 14.2 |
| 66 | 69 | 10 | 1 | 0 | 0 | 20 | 75 | 72 | 14.1 |
| 67 | 60 | 10 | 10 | 0 | 0 | 20 | 72 | 70 | 14.6 |
| 68 | 65 | 10 | 0 | 5 | 0 | 20 | 82 | 80 | 15.2 |
| 69 | 65 | 10 | 0 | 0 | 5 | 20 | 78 | 79 | 15.1 |

TABLE 6

| Sample No. | Sialon Component | | Additive Component | | | | Mechanical Strength (1300° C.) (kg/mm²) | Mechanical Strength (1300° C.) (kg/mm²) | Fracture Toughness (MPam^½) |
|---|---|---|---|---|---|---|---|---|---|
| | $Si_3N_4$ (wt %) | $Al_2O_3$ (wt %) | $HfO_2$ (wt %) | HfN (wt %) | HfC (wt %) | SiC Continuous Fiber (wt %) | | | |
| 70 | 70 | 10 | 0 | 0 | 0 | 20 | 55 | 53 | 7.6 |
| 71 | 90 | 10 | 0 | 0 | 0 | 0 | 55 | 52 | 3.9 |
| 72 | 85 | 10 | 5 | 0 | 0 | 0 | 63 | 62 | 4.1 | cordingly, various modifications may be made without departing from the spirit or scope of the general inventive concept as defined by the appended claims and their equivalents.

TABLE 7

| Sample No. | Sialon Component | | Additive Component | | | | Mechanical Strength (1300° C.) (kg/mm$^2$) | Mechanical Strength (1300° C.) (kg/mm$^2$) | Fracture Toughness (MPam$^{\frac{1}{2}}$) |
| --- | --- | --- | --- | --- | --- | --- | --- | --- | --- |
| | Si$_3$N$_4$ (wt %) | Al$_2$O$_3$ (wt %) | HfO$_2$ (wt %) | HfN (wt %) | HfC (wt %) | SiC Continuous Fiber (wt %) | | | |
| 73 | 82 | 10 | 3 | 0 | 0 | 5 | 105 | 104 | 7.2 |
| 74 | 77 | 10 | 3 | 0 | 0 | 10 | 106 | 106 | 7.4 |
| 75 | 67 | 10 | 3 | 0 | 0 | 20 | 103 | 105 | 7.8 |
| 76 | 57 | 10 | 3 | 0 | 0 | 30 | 100 | 98 | 8.1 |
| 77 | 47 | 10 | 3 | 0 | 0 | 40 | 98 | 100 | 8.3 |
| 78 | 72 | 5 | 3 | 0 | 0 | 20 | 100 | 96 | 7.5 |
| 79 | 62 | 15 | 3 | 0 | 0 | 20 | 105 | 107 | 7.9 |
| 80 | 57 | 20 | 3 | 0 | 0 | 20 | 106 | 102 | 7.4 |
| 81 | 69 | 10 | 1 | 0 | 0 | 20 | 96 | 96 | 7.1 |
| 82 | 60 | 10 | 10 | 0 | 0 | 20 | 94 | 98 | 7.3 |
| 83 | 65 | 10 | 0 | 5 | 0 | 20 | 102 | 105 | 7.7 |
| 84 | 65 | 10 | 0 | 0 | 5 | 20 | 100 | 100 | 7.7 |

TABLE 8

| Sample No. | Sialon Component | | Additive Component | | | | Mechanical Strength (1300° C.) (kg/mm$^2$) | Mechanical Strength (1300° C.) (kg/mm$^2$) | Fracture Toughness (MPam$^{\frac{1}{2}}$) |
| --- | --- | --- | --- | --- | --- | --- | --- | --- | --- |
| | Si$_3$N$_4$ (wt %) | Al$_2$O$_3$ (wt %) | HfO$_2$ (wt %) | HfN (wt %) | HfC (wt %) | SiC Continuous Fiber (wt %) | | | |
| 85 | 70 | 10 | 0 | 0 | 0 | 20 | 58 | 56 | 4.4 |
| 86 | 90 | 10 | 0 | 0 | 0 | 0 | 55 | 52 | 3.9 |
| 87 | 85 | 10 | 5 | 0 | 0 | 0 | 63 | 62 | 4.1 |

What is claimed is:

1. A sialon based composite consisting essentially of 5 wt % to 40 wt % of SiC fibers, 0.3 wt % to 10 wt % of an Hf component which is calculated in terms of Hf oxide, and the balance of a sialon as a major constituent.

2. A composite according to claim 1, wherein the major constituent is α- or β-sialon.

3. A composite according to claim 1, wherein the SiC fibers are contained in the composite in a range of 10 wt % to 30 wt %.

4. A composite according to claim 1, wherein the Hf component is contained in the composite in a range of 1 wt % to 7 wt %.

5. A composite according to claim 1, wherein the Hf component contains an Hf compound or metal Hf.

6. A composite according to claim 5, wherein the Hf compound is at least one selected from the group consisting of HfO$_2$, HfC, HfN, HfB$_2$, and HfSi$_2$.

7. A method of manufacturing a sialon based composite, comprising the first step of preparing a powder mixture as a starting material consisting essentially of 5 wt % to 40 wt % of SiC fibers, 0.3 wt % to 10 wt % of an Hf component which calculated in terms of Hf oxide, and the balance of Si$_3$N$_4$ and Al$_2$O$_3$ as a sialon component, and the second step of sintering the powder mixture.

8. A method according to claim 7, wherein the major component is β-sialon.

9. A method according to claim 7, wherein the SiC fibers are contained in the composite in a range of 10 wt % to 30 wt %.

10. A method according to claim 7, wherein the Hf component is contained in the composite in a range of 1 wt % to 7 wt %.

11. A method according to claim 7, wherein the Hf component contains an Hf compound or metal Hf.

12. A method according to claim 11, wherein the Hf compound is at least one selected from the group consisting of HfO$_2$, HfC, HfN, HfB$_2$, and HfSi$_2$.

13. A method according to claim 7, wherein the second step comprises hot-pressing the powder mixture obtained in the first step.

14. A method according to claim 7, wherein said sialon component consists essentially of 5 wt % to 30 wt % of Al$_2$O$_3$ and the balance of Si$_3$N$_4$.

15. A sialon based composite consisting essentially of 5 wt. % to 40 wt. % of SiC fibers, 0.3 wt. % to 10 wt. % of an Hf component which is calculated in terms of Hf oxide, and the balance of β-sialon as a major constituent.

16. A sialon based composite consisting essentially of 5 wt. % to 40 wt. % of SiC fibers, 0.3 wt. % to 10 wt. % of an Hf component which is calculated in terms of Hf oxide, and the balance of β-sialon as a major constituent, said Hf component being at least one selected from the group consisting of HfO$_2$, HfC and HfN.

* * * * *